(12) United States Patent
Egawa et al.

(10) Patent No.: US 8,737,487 B2
(45) Date of Patent: May 27, 2014

(54) INFORMATION PROCESSING APPARATUS

(75) Inventors: Akihiro Egawa, Tokyo (JP); Jun Takeshita, Tokyo (JP); Yasunori Enokizono, Tokyo (JP)

(73) Assignee: Sony Corporation, Tokyo (JP)

( * ) Notice: Subject to any disclaimer, the term of this patent is extended or adjusted under 35 U.S.C. 154(b) by 1424 days.

(21) Appl. No.: 11/736,937

(22) Filed: Apr. 18, 2007

(65) Prior Publication Data

US 2008/0075429 A1 Mar. 27, 2008

(30) Foreign Application Priority Data

May 24, 2006 (JP) ................................. 2006-143661

(51) Int. Cl.
*H04N 5/91* (2006.01)
*H04N 5/913* (2006.01)
*H04N 21/426* (2011.01)
*H04N 21/432* (2011.01)

(52) U.S. Cl.
CPC ......... *H04N 5/913* (2013.01); *H04N 21/42646* (2013.01); *H04N 21/4325* (2013.01)
USPC .................. 375/240.25; 375/240; 375/240.01

(58) Field of Classification Search
CPC ............ H04N 5/913; H04N 21/42646; H04N 21/4325
USPC ............................... 375/240.25, 240, 240.01
See application file for complete search history.

(56) References Cited

U.S. PATENT DOCUMENTS

| | | | | | |
|---|---|---|---|---|---|
| 2,957,939 | A | * | 10/1960 | Morris | 380/231 |
| 2,994,739 | A | * | 8/1961 | Roschke | 380/240 |
| RE25,521 | E | * | 2/1964 | Morris | 380/231 |
| 3,813,482 | A | * | 5/1974 | Blonder | 380/223 |
| 3,919,462 | A | * | 11/1975 | Hartung et al. | 380/235 |
| 4,019,201 | A | * | 4/1977 | Hartung et al. | 380/235 |

(Continued)

FOREIGN PATENT DOCUMENTS

| | | |
|---|---|---|
| JP | 5-103328 | 4/1993 |
| JP | 6-502937 | 3/1994 |

(Continued)

OTHER PUBLICATIONS

Bloom et al.; Copy protection for DVD video; Jul. 1999, Proceedings of the IEEE (vol. 87 , Issue: 7) pp. 1267-1276.*

(Continued)

*Primary Examiner* — Bradley Holder
(74) *Attorney, Agent, or Firm* — Oblon, Spivak, McClelland, Maier & Neustadt, L.L.P.

(57) ABSTRACT

An information processing apparatus includes a first processing circuit having a capability of decoding encoded stream data input to the first processing circuit and a capability of detecting tampering on encryption information, the first processing circuit being configured to, if tampering is detected, add a tamper flag to the tampered data, a second processing circuit configured to perform a predetermined process on data output from the first processing circuit, and, if the data includes the tamper flag, add tamper information indicating the fact being subjected to tampering to the processed data, and a third processing circuit configured to receive data output from the second processing circuit and process the received data such that when the received data does not include tamper information, the received data is processed in a normal manner, but when the received data includes tamper information added thereto, the received data is processed differently from the normal manner.

7 Claims, 6 Drawing Sheets

(56) References Cited

U.S. PATENT DOCUMENTS

| | | | | |
|---|---|---|---|---|
| 4,024,576 A | * | 5/1977 | Hartung et al. | 380/235 |
| 4,045,814 A | * | 8/1977 | Hartung et al. | 380/235 |
| 4,338,628 A | * | 7/1982 | Payne et al. | 380/213 |
| 4,430,669 A | * | 2/1984 | Cheung | 380/241 |
| 4,467,353 A | * | 8/1984 | Citta et al. | 380/219 |
| 4,514,761 A | * | 4/1985 | Merrell et al. | 380/239 |
| 4,594,609 A | * | 6/1986 | Romao et al. | 380/218 |
| 4,628,359 A | * | 12/1986 | Okada et al. | 380/241 |
| 4,635,112 A | * | 1/1987 | Tomioka et al. | 380/201 |
| 4,663,659 A | * | 5/1987 | Blatter | 380/213 |
| 4,679,078 A | * | 7/1987 | Wong et al. | 380/222 |
| 4,790,010 A | * | 12/1988 | Sgrignoli | 380/210 |
| 4,964,162 A | * | 10/1990 | McAdam et al. | 380/215 |
| 5,091,938 A | * | 2/1992 | Thompson et al. | 380/239 |
| 5,161,187 A | * | 11/1992 | Kajita et al. | 380/222 |
| 5,166,976 A | * | 11/1992 | Thompson et al. | 380/225 |
| 5,185,794 A | * | 2/1993 | Thompson et al. | 380/235 |
| 5,267,312 A | * | 11/1993 | Thompson et al. | 380/237 |
| 5,406,627 A | * | 4/1995 | Thompson et al. | 380/237 |
| 6,009,172 A | * | 12/1999 | Kurowski et al. | 380/218 |
| 6,091,822 A | * | 7/2000 | Mellows et al. | 380/210 |
| 6,216,228 B1 | * | 4/2001 | Chapman et al. | 713/176 |
| 6,292,567 B1 | * | 9/2001 | Marland | 380/208 |
| 6,459,795 B1 | * | 10/2002 | Quan | 380/221 |
| 6,542,609 B1 | * | 4/2003 | Ryan et al. | 380/210 |
| 6,819,765 B1 | * | 11/2004 | Kori | 380/203 |
| 6,950,520 B1 | * | 9/2005 | Ryan et al. | 380/200 |
| 2003/0201675 A1 | * | 10/2003 | Alexanian et al. | 307/116 |
| 2004/0047469 A1 | * | 3/2004 | Ryan et al. | 380/210 |

FOREIGN PATENT DOCUMENTS

| | | |
|---|---|---|
| JP | 7-193813 | 7/1995 |
| JP | 2002-133765 | 5/2002 |
| JP | 2003-333566 | 11/2003 |
| JP | 2004-88565 | 3/2004 |
| KR | 10-0252085 | 4/2000 |
| WO | WO 89/06014 | 6/1989 |
| WO | WO 2005/043899 A1 | 5/2005 |

OTHER PUBLICATIONS

He et al.; A secure and robust object-based video authentication system; Jan. 2004, Hindawi Publishing Corp. New York, NY; EURASIP Journal on Applied Signal Processing archive vol. 2004, Jan. 1, 2004, pp. 2185-2200.*

Korean Office Action issued Jun. 20, 2013 in Patent Application No. 10-2007-0050103 with English Translation.

* cited by examiner

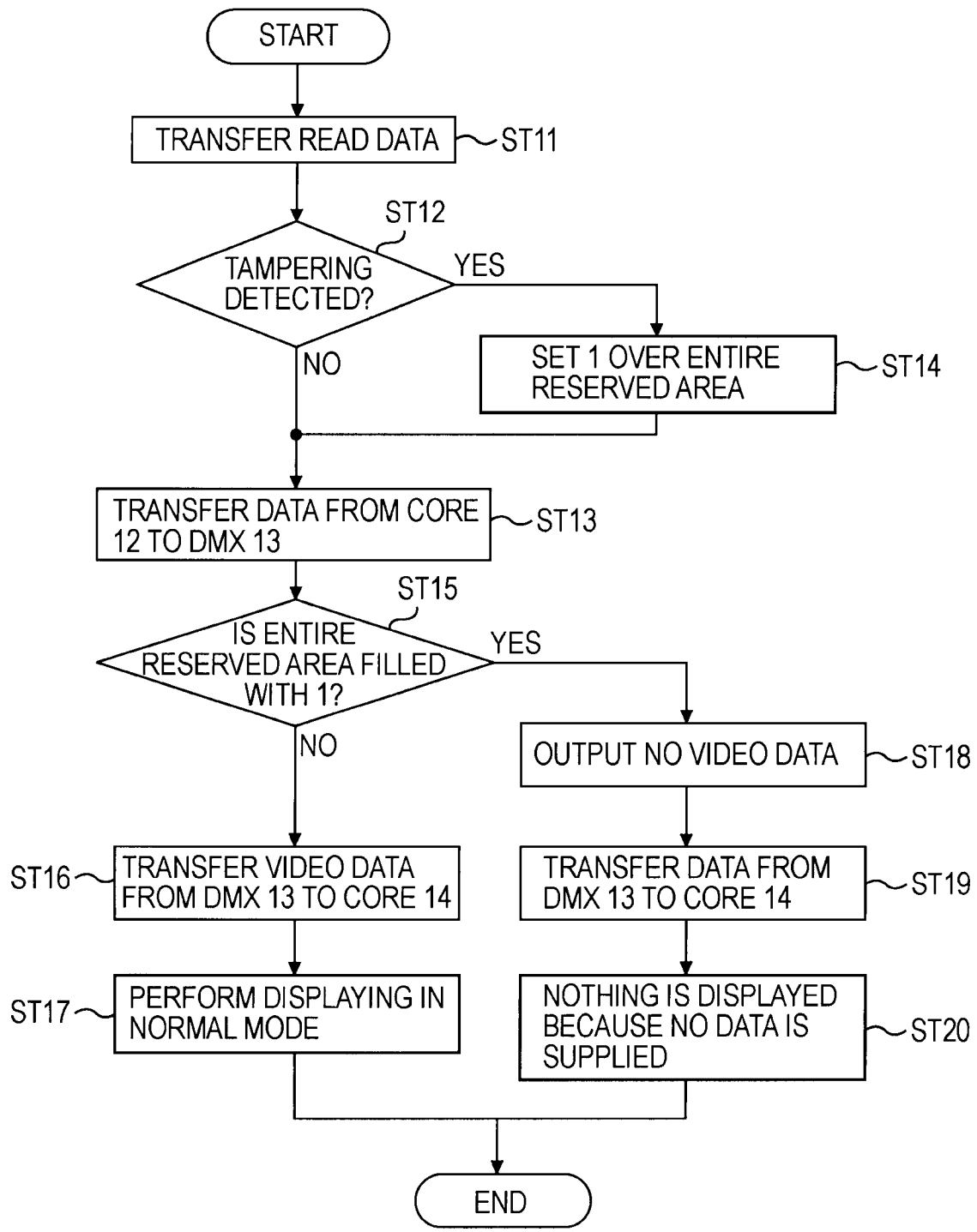

INFORMATION PROCESSING APPARATUS

CROSS REFERENCES TO RELATED APPLICATIONS

The present invention contains subject matter related to Japanese Patent Application JP 2006-143661 filed in the Japanese Patent Office on May 24, 2006, the entire contents of which are incorporated herein by reference.

BACKGROUND OF THE INVENTION

1. Field of the Invention

The present invention relates to an information processing apparatus capable of performing a predetermined process, such as scrambling, on tampered stream data.

2. Description of the Related Art

A content recorded on a recording media such as a DVD disk or a hard disk recorder, encryption is performed to protect the content, and status information indicating the encryption status is added to the content data.

In order to secure the content, it is important that the status information indicating encryption status is valid.

For example, a program stream stored on a DVD disk or the like is in a state in which the program stream is scrambled. To play back the program stream, it is necessary descramble the program stream read from the DVD disk.

However, if information described in a header or the like of the scrambled data is tampered with, audio/video data can be played back in an unauthorized manner. For example, if data which should be protected from being copied is subjected to tampering, the data can be freely copied.

To avoid the above problem, when the status information is subjected to tampering, the content is generally protected as follows.

First, in a logical process in the decoding, the status information is checked whether it has been subjected to tampering.

If tampering is detected, this fact is notified to a CPU (control system).

If the CPU receives the notification, the CPU issues a command to a display logic circuit to perform scrambling.

SUMMARY OF THE INVENTION

In order to perfectly protect copyright of data, exact timing of scrambling is necessary so that when tampering of encryption information is detected, any small part of data should not be played back.

However, in the technique described above, because scrambling is performed via the CPU, some part of a tampered stream can pass though hardware block before the CPU completes the scrambling operation, and thus the some part of the stream can be displayed. That is, the timing of scrambling is not as precise as required.

Thus, when status information indicating the encryption status of content to be protected is tampered with, there is a possibility that some part of the content is displayed or scrambling is performed too early.

In the case where content is copied on a HDD or the like, when tampering is detected, if some part of the content has already been copied, it is possible to avoid the above problem by deleting the copied part of the content. However, in the case where the content is displayed in real time, a problem can occur that some part of the content has already been displayed or, on the contrary, some data which should be displayed is not displayed.

In view of the above, it is desirable to provide an information processing apparatus capable of, if tampering on stream data is detected, adequately handling the stream data exactly, for example, by scrambling the stream data, at a correct time whereby data which should be protected is surely protected without incorrectly protecting data which is not needed to be protected.

According to an embodiment of the present invention, there is provided an information processing apparatus comprising a first processing circuit having a capability of decoding encoded stream data input to the first processing circuit and a capability of detecting tampering on encryption information, the first processing circuit being configured to, if tampering is detected, add a tamper flag to the tampered data, a second processing circuit configured to perform a predetermined process on data output from the first processing circuit, and, if the data includes the tamper flag, add tamper information indicating the fact being subjected to tampering to the processed data, and a third processing circuit configured to receive data output from the second processing circuit and process the received data such that when the received data does not include tamper information, the received data is processed in a normal manner, but when the received data includes tamper information added thereto, the received data is processed differently from the normal manner.

In this information processing apparatus, the data processed by the second processing circuit may include at least video data, and in the case where the video data includes tamer information added thereto, the third processing circuit may process the video data such that the video data is not displayed in a normal manner.

When the second processing circuit receives the video data including the tamper flag added thereto, the second processing circuit may add scramble information as tamper information in a blanking area of the video data, and when the third processing circuit receives the video data including the scramble information added thereto, the third processing circuit may scramble the video data and display the scrambled video data.

When the second processing circuit receives video data including the tamper flag added thereto, the second processing circuit may output tamper information indicating that no video data should be displayed, and when the third processing circuit receives the tamper information indicating that no video data should be displayed, the third processing circuit may stop displaying of the video data.

The data processed by the second processing circuit may include at least audio data, and in the case where the audio data includes tamer information added thereto, the third processing circuit may stop outputting of the audio data.

The information processing apparatus may further comprise an external output controller configured to control outputting of data such that when the data processed by the first processing circuit is output to the outside, if the data includes the tamper flag added thereto, the data is output after the tamper flag is cleared.

According to another embodiment of the present invention, there is provided an information processing apparatus comprising an encryption processing core having a capability of decoding encoded stream data including audio data and video data input to the encryption processing core and a capability of detecting tampering on encryption information, the encryption processing core being configured to, if tampering is detected, add a tamper flag to the tampered data, a demultiplexer configured to demultiplex the stream data supplied from the encryption processing core into the video data and the audio data, and, if the data includes the tamper flag added thereto, output the data after adding information indicating the fact of being subjected to tampering to the data, and a display processing core configured to receive the data output from the demultiplexer and display the data such that when the data does not include the tamper information added thereto, the data is displayed in a normal manner, but when the data includes the tamper information added thereto, the data is scrambled or displaying of the data is stopped.

The present invention provides the following advantages. That is, when tampering on stream data is detected, the stream data is handled, for example, by performing scrambling exactly at a right time.

Thus, data which should be protected is surely protected without incorrectly protecting data which is not needed to be protected.

BRIEF DESCRIPTION OF THE DRAWINGS

FIG. 6 is a flow chart showing a processing algorithm according to an embodiment of the present invention.

DESCRIPTION OF THE PREFERRED EMBODIMENTS

The present invention is described in further detail below with reference to embodiments in conjunction with the accompanying drawings.

Figure 1:
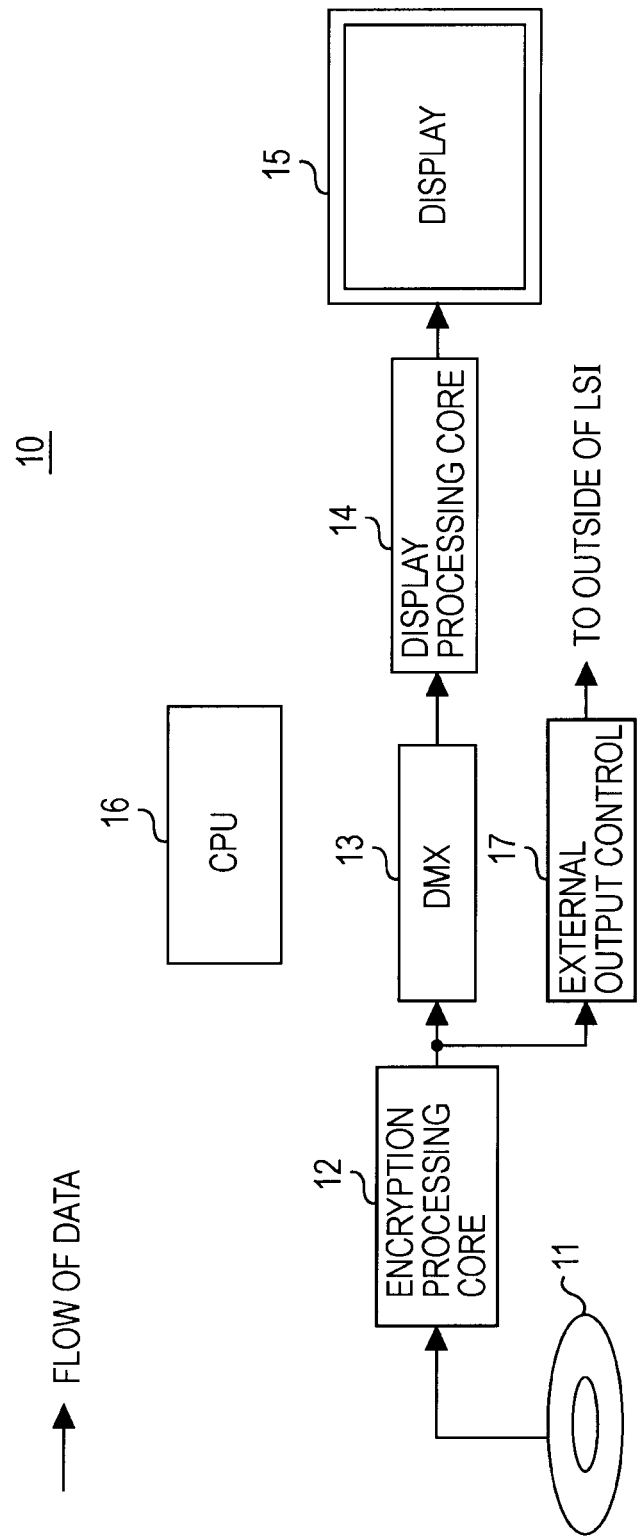
FIG. 1 is a diagram showing an example of a configuration of an information processing apparatus having a capability of scrambling tampered data according to an embodiment of the present invention.

FIG. 1 shows an example of a configuration of an information processing apparatus having a capability of scrambling tampered data according to an embodiment of the present invention.

The information processing apparatus 10 is configured to perform a process to handle tampered data not by a CPU but by hardware.

More specifically, the information processing apparatus 10 attaches tamper information directly to a stream so that data being displayed is scrambled without a timing delay which will occur if the tamper information is provided via the CPU.

That is, if the information processing apparatus 10 detects that a stream has been tampered with, the information processing apparatus 10 attaches tamper information directly to the tampered stream so that the stream itself has the tamper information thereby making it possible to control scrambling by a hardware unit. Thus, scrambling is controlled correctly without a timing error which can occur in the case where scrambling is controlled by software via the CPU.

The details of the configuration and functions of the information processing apparatus 10 are described below.

As shown in FIG. 1, the information processing apparatus 10 includes a recording medium 11 such as a DVD disk, a first processing circuit serving as an encryption processing core 12, a second processing circuit serving as a demultiplexer (DMX) 13, a third processing circuit serving as a display processing core 14, a display device 15, a CPU (controller) 16, and an external output controller 17.

In the information processing apparatus 10, a data path is provided among the encryption processing core 12 configured to decode data read from the recording medium 11, the demultiplexer 13, the display processing core 14 configured to process image data such as scrambling as required, and the CPU 16 responsible for control over the entire apparatus.

A data path is also provided between the encryption processing core 12 configured to decode data read from the recording medium 11 and the external output controller 17 configured to output stream data to the outside of the LSI.

The encryption processing core 12 has a capability of executing a basic encryption processing algorithm according to the DES standard, the AES standard, or the like. The encryption processing core 12 also has a capability of checking whether data has been tampered with.

The display processing core 14 has a capability of scrambling image data according to, for example, the Macrovision standard.

In a normal state, the encryption processing core 12 decodes data input from the recording medium 11. However, if it is detected that status information of encryption information of the input data has been tampered with, the encryption processing core 12 adds a tamper flag to the decoded data to indicate that the data has been tampered with, and outputs the resultant data to the demultiplexer 13.

The encryption processing core 12 writes the tamper flag in a data area such as a reserved data area such that the tamper flag does not exert an influence on content data or automatically produces data and writes the tamper flag therein.

For example, in the case where tampering on a program stream (PS) read from a DVD disk is detected, the tamper flag may be written at a private bit in a navigation pack, or data of a private stream 2 may be created and the tamper flag may be written in the created data of the private stream 2.

Figure 2:
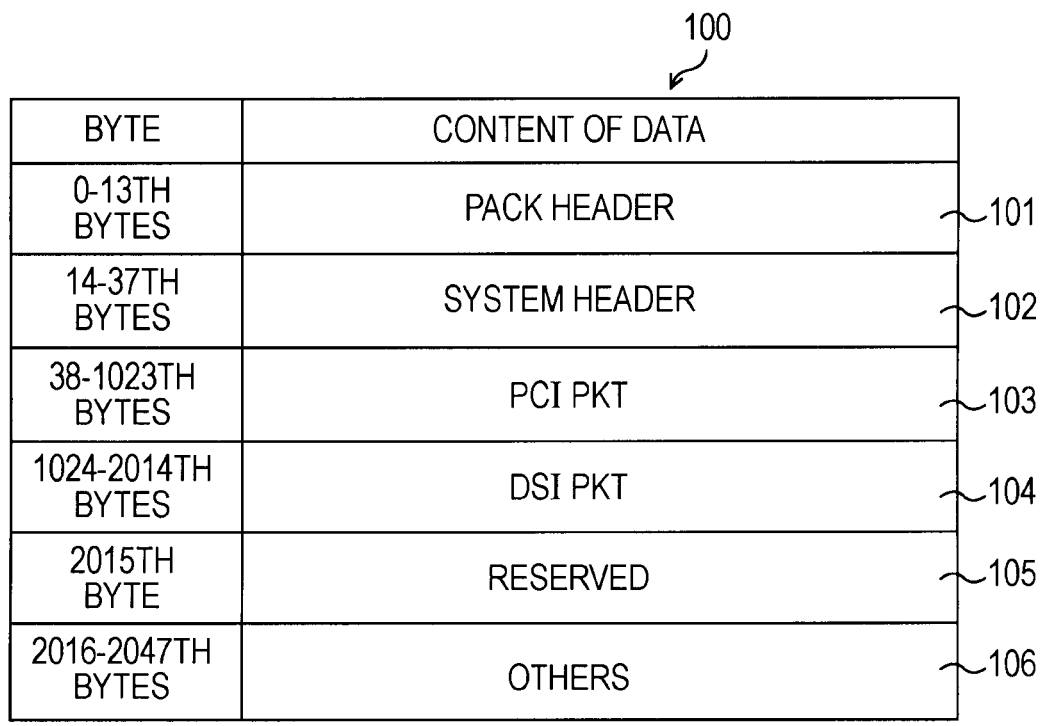
FIG. 2 is a diagram showing a format of the navigation pack.

FIG. 2 shows a format of the navigation pack.

As shown in FIG. 2, the navigation pack 100 includes a total of 2048 bytes, wherein 0th to thirteenth bytes are assigned to a pack header area 101, fourteenth to 37th bytes are assigned to a system header area 102, 38th to 1023th bytes are assigned to a PCI packet area 103, 1024th to 2014th bytes are assigned to a DSI packet area 104, a 2015th byte is assigned to a reserved area 105, and 2016th to 2047th bytes are assigned to other areas 106.

For example, when the encryption processing core 12 detects tampering on a program stream (PS) read from a DVD disk, the encryption processing core 12 may set "1" in the reserved area 105 in the navigation pack 100.

The demultiplexer 13 demultiplexes the stream data supplied from the encryption processing core 12 into video data and audio data. Even when the stream data includes a tamper flag, the demultiplexing process is also performed in a normal manner, but the tamper flag is added to the video data or scramble information is added in a blanking area or tamper information, indicating that no video data should be displayed or indicating that the data includes a tampered part, is added to the data. The resultant data is output to the display processing core 14.

In the normal state, the display processing core 14 performs a scrambling process on image data to be output to the display device 15 according to setting made by the CPU 16. However, when the input data includes a tamper flag, the tamper information is detected by hardware, and scrambling is performed or displaying of the data is stopped.

As described above, the data including the tamper flag added thereto in the reserved area or the like is used only in the LSI, and no influence on the outside of the LSI occurs.

The stream data and other data are defined as follows.

In the case where encryption is performed according to the DVD+ standard, stream data is read from a DVD disk, and the "stream" data refers to a program stream (PS).

The present invention may also be applied to a transport stream (TS) or the like, if an algorithm of detecting tampering, other than that based on the DVD+ standard, is available.

Image data (image signal) is obtained by demultiplexing a program stream or the like into audio data and video data by a demultiplexer and decoding the resultant video data.

In the present embodiment, the "scrambled" data denotes data produced by scrambling a program stream or the like. Descrambling is performed in accordance with information described in a header or the like of the scrambled data.

Figure 3:
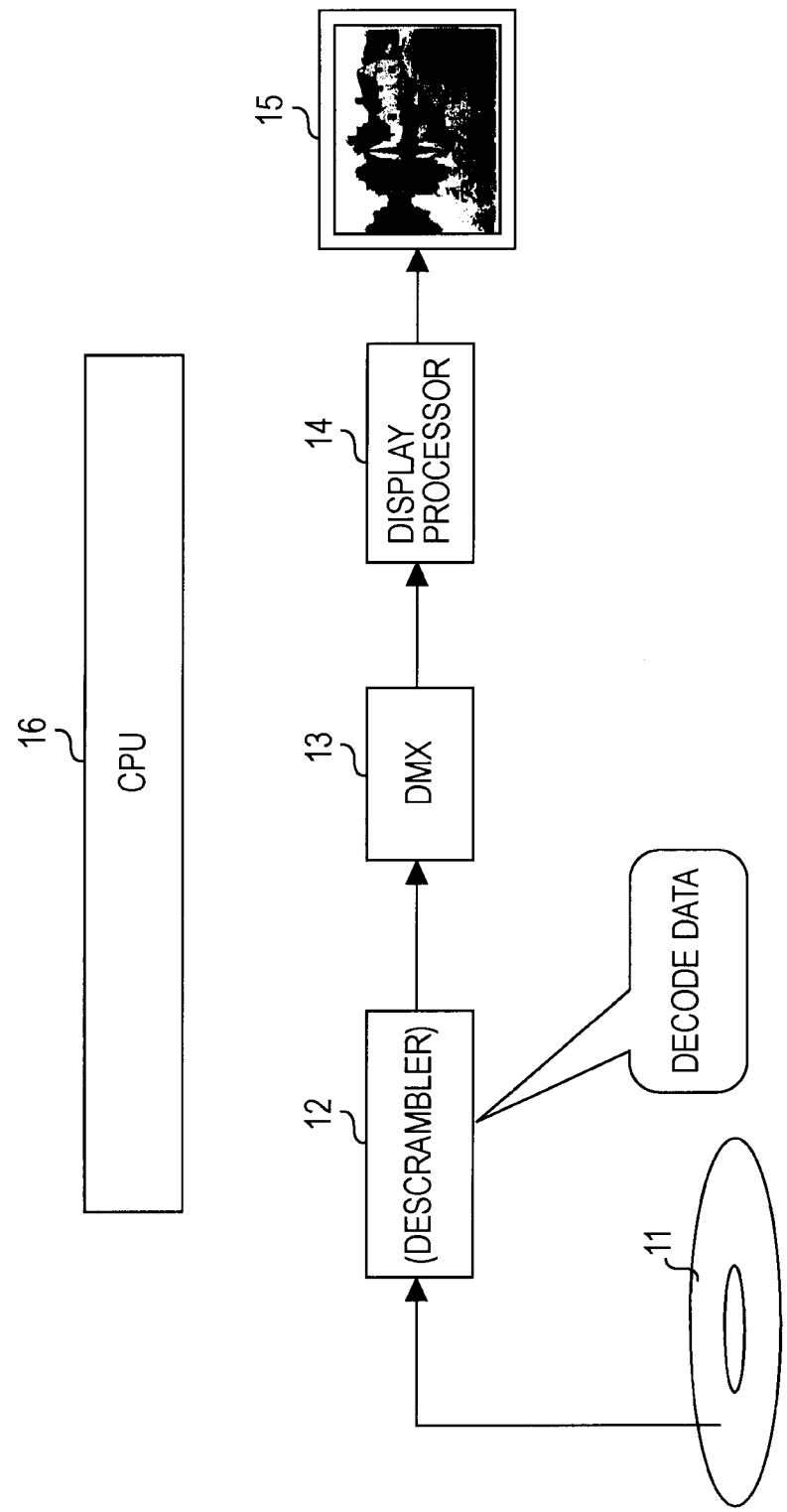
FIG. 3 is a diagram showing a flow of data in the information processing apparatus in a normal playback operation, according to an embodiment of the present invention.

FIG. 3 shows a flow of data in the information processing apparatus in a normal playback operation, according to the present embodiment.

Figure 4:
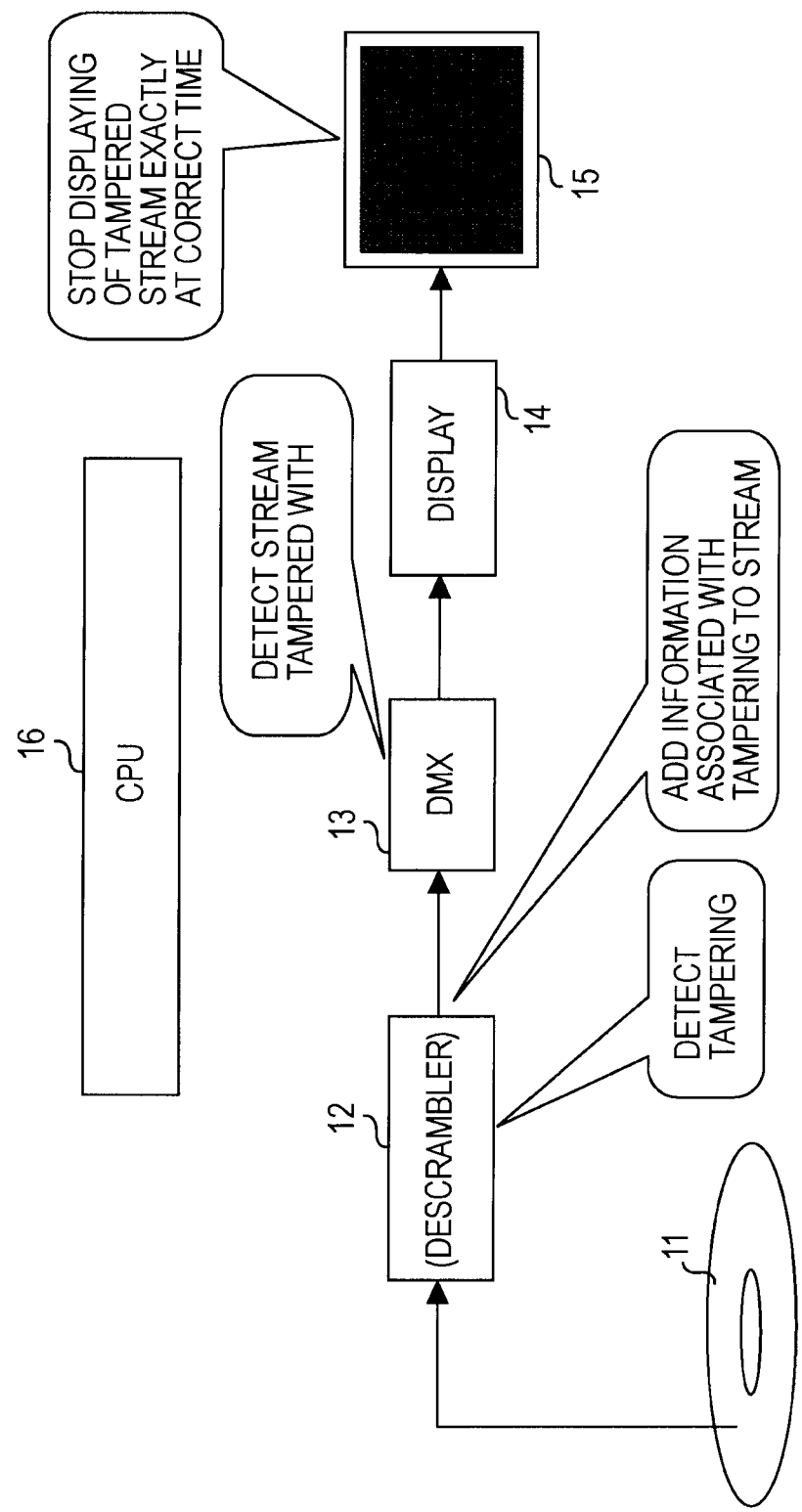
FIG. 4 shows a manner in which when an information processing apparatus detects tampering on stream data, the stream data is adequately handled according to an embodiment of the present invention.

FIG. 4 shows a manner in which when an information processing apparatus detects tampering on stream data, the stream data is adequately handled according to the present embodiment of the invention.

As shown in FIG. 3, in the case where the encryption processing core 12 determines that the stream data has not been tampered with, the stream data is descrambled and the resultant descrambled data is supplied without attaching a flag to the demultiplexer 13.

The demultiplexer 13 demultiplexes the stream data supplied from the encryption processing core 12 into video data and audio data and outputs them to the display processing core 14.

The display processing core 14 outputs data of an image to be displayed on the display device 15.

As shown in FIG. 4, if the encryption processing core 12 detects that the stream data has been tampered with, then the encryption processing core 12 adds (sets) a tamper flag indicating that the stream data has been tampered with to the stream data and supplies the data to the demultiplexer 13.

The demultiplexer 13 demultiplexes the stream data supplied from the encryption processing core 12 into video data and audio data and outputs the video data added with the tamper flag and the audio data to the display processing core 14.

If the video data input to the display processing core 14 includes the tamper flag, the tamper flag is detected by hardware and the video data is scrambled so that displaying of the tampered stream is stopped at an exactly right time, as shown in FIG. 4.

In the present embodiment, as described above, detection of tampering and control of scrambling are performed by hardware, and notifying of tampering between blocks is performed by using data itself thereby protecting content in a highly reliable manner.

Alternatively, in addition to protection of video data by scrambling, audio data may also be protected by stopping playback of audio data if tampering on the audio data is detected.

Referring to flow charts shown in FIGS. 5 and 6, two examples of processing algorithms according to the present invention are described below.

Figure 5:
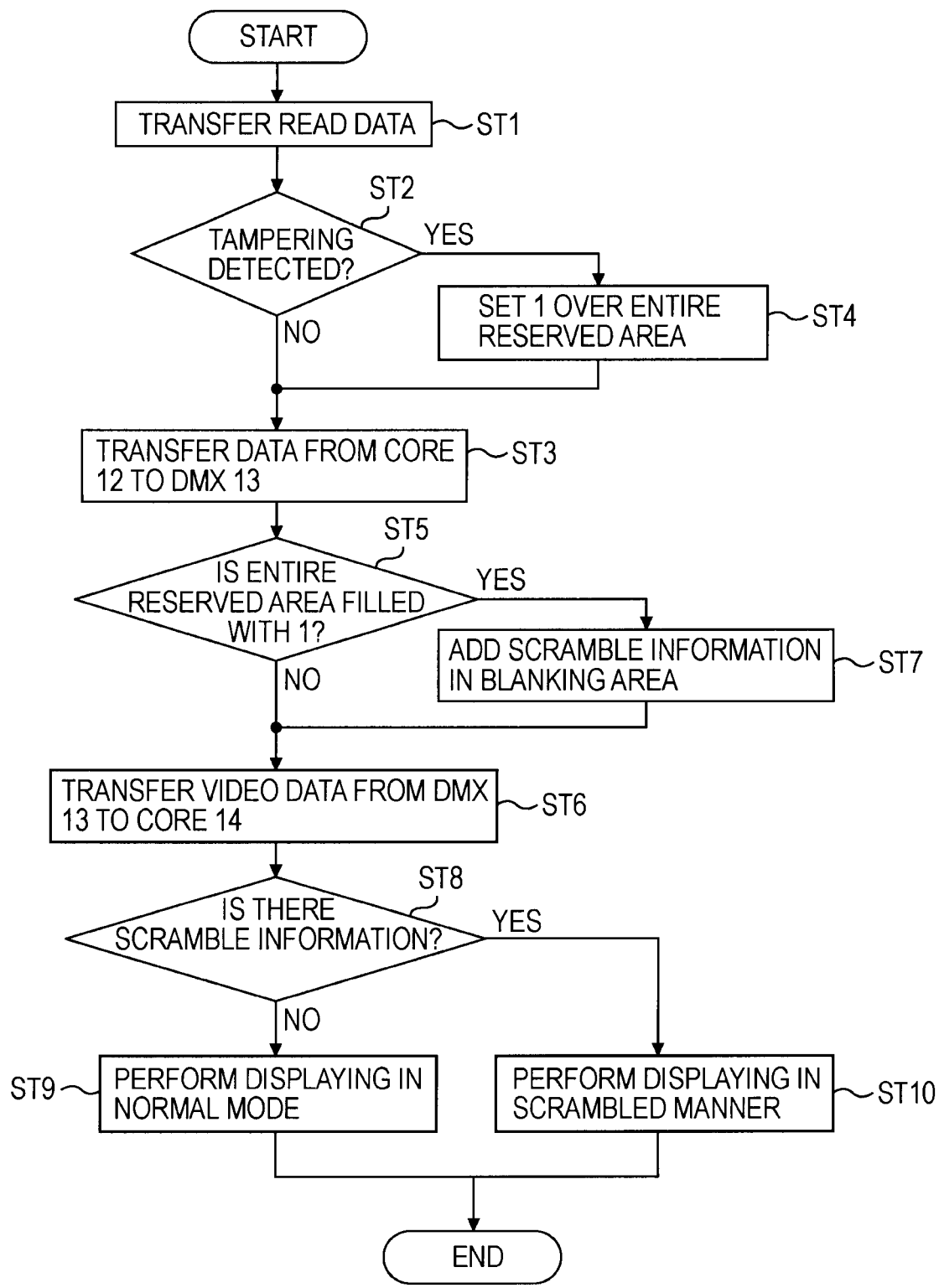
FIG. 5 is a flow chart showing a processing algorithm according to an embodiment of the present invention.

FIG. 5 is a flow chart showing a first processing algorithm according to an embodiment of the present invention.

FIG. 6 is a flow chart showing a second processing algorithm according to an embodiment of the present invention.

First, referring to the flow chart shown in FIG. 5, the first processing algorithm is described.

When content data (video signal) is read from the recording medium 11 (step ST1), the encryption processing core 12 determines whether the content data has been tampered with (step ST2).

For example, in the case of content data including a navigation pack, when the content data is not subjected to tampering, and the content data is decoded and the navigation pack is descrambled and directly transferred to the demultiplexer 13 (step ST3).

On the other hand, if tampering is detected in step ST2, the reserved area of the tampered navigation pack is entirely filled with 1 (step ST4) and the resultant data is transferred to the demultiplexer 13 (step ST3).

If the demultiplexer 13 receives the stream data from the encryption processing core 12, the demultiplexer 13 determines whether the entire reserved area of the navigation pack is filled with 1 (step ST5).

If the entire reserved area is not filled with 1, the demultiplexer 13 demultiplexes the stream data into video data and audio data and outputs them to the display processing core 14 (step ST6).

On the other hand, if the entire reserved area is filled with 1, the demultiplexer 13 adds scramble information in a blanking area of the video data (step ST7) and outputs the resultant data to the display processing core 14 (step ST6).

If the display processing core 14 receives the data from the demultiplexer 13, the display processing core 14 determines whether the video data has scramble information in the blanking area (step ST8).

In the case where no scramble information is detected, the display processing core 14 displays the video data on the display device 15 in a normal manner (step ST9).

On the other hand, if scramble information is detected, the display processing core 14 scrambles the video data displayed on the display device 15 (step ST10).

That is, the display processing core 14 scrambles the video data displayed on the display device 15 or outputs the video data in a normal manner to the display device 15 depending on whether scramble information is detected in the blanking area.

Now, referring to the flow chart shown in FIG. 6, the second processing algorithm is described.

When content data is read from the recording medium 11 (step ST11), the encryption processing core 12 determines whether the content data has been tampered with (step ST12).

For example, in the case of content data including a navigation pack, when the content data is not subjected to tampering, and the content data is decoded and the navigation pack is descrambled and directly transferred to the demultiplexer 13 (step ST13).

On the other hand, if tampering is detected in step ST12, the reserved area of the tampered navigation pack is entirely filled with 1 (step ST14) and the resultant data is transferred to the demultiplexer 13 (step ST13).

If the demultiplexer 13 receives the stream data from the encryption processing core 12, the demultiplexer 13 determines whether the entire reserved area of the navigation pack is filled with 1 (step ST15).

If the entire reserved area is not filled with 1, the demultiplexer 13 separates the stream data into video data and audio data and outputs them to the display processing core 14 (step ST16).

In this case, the display processing core 14 displays the video data on the display device 15 in a normal manner (step ST17).

On the other hand, if the entire reserved area is filled with 1, the demultiplexer 13 sets the tamer information so as to specify that no video data should be displayed (step ST18) and outputs it to the display processing core 14 (step ST19).

In response to receiving the tamper information specifying that no video data should be displayed, the display processing core 14 displays no video data on the display device 15 (step ST 20).

In the second processing algorithm, as described above, when the entire reserved area of the navigation pack is filled with 1, the demultiplexer 13 specifies that no video data should be displayed, and accordingly the display device 15 displays nothing.

The difference between the first processing algorithm and the second processing algorithm is in that a scrambled image is displayed on the display device 15 or nothing is displayed depending when tampering is detected, but there is no difference in that the navigation pack included in the stream data is used to describe tamper information.

Note that when data is supplied to the outside of the LSI, the entire reserved area in which the tamper information is described is cleared to 0 by the external output control block 17 disposed at a stage following the encryption processing core 12, so that no influence is exerted on the outside of the LSI.

In the present embodiment, as described above, when stream data input from the recording medium 11 is decoded, if tampering on status information of encryption information is detected, the encryption processing core 12 adds a tamper flag to the data. In the demultiplexer 13, the stream data supplied from the encryption processing core 12 is separated into video data and audio data regardless of whether the tamper flag is added, and information indicating the fact of being subjected to tampering is added to the video data. In the display processing core 14, if the received data includes the tamper information indicating the fact of being subjected to tampering, the tamper flag is detected by hardware and the video data is scrambled or nothing is displayed. Thus, scrambling is performed such that only tampered data is scrambled with precise timing or the tampered data is not displayed at all. This prevents an increase in processing load on software to handle tampering.

Use of hardware in handing of tampering makes it possible to protect contents in a more reliable manner, and thus an improvement in security level is achieved.

The present embodiment may also be applied to an algorithm of detecting tampering of encryption information according to the DVD+ standard.

More specifically, if a tampered stream is detected, tamper information is written in a header of the detected stream. When this stream is demultiplexed into audio data and video data, the tamper information is added to the video data thereby preventing this video data from being decoded in an unauthorized manner.

In this case, no video data is displayed or scrambled data is displayed depending on specifications of a playback apparatus. For example, tamper information may be described in the blanking area to specify that video data should be scrambled according to the Macrovision standard.

In any case where the tamper information added with the video data indicates the fact of being subjected to tampering, the manner of outputting the tampered video data may be changed depending on a system used.

Note that when audio data is output after being decoded, outputting of it may also be controlled in a similar manner to the video data. For example, if tampering is detected, outputting of the audio data may be stopped.

A wide variety of apparatus such as a DVD recorder, a network television set, etc. may be used as the information processing apparatus according to the present embodiment.

When data read from a disk or data received via a network includes tampered data, only the tampered data may be scrambled according to the present embodiment of the invention.

In the embodiment described above, when tampering is detected, 1 is set in the entire reserved area of the navigation pack. Alternatively, 1 may be set only at a particular bit as long as the tamper flag can be correctly written to indicate the fact of being subjected to tampering.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a first processing circuit, including a hardware circuit, configured to decode encoded stream data including audio data and video data input to the first processing circuit and to detect tampering on encryption information, the first processing circuit being configured to add a tamper flag to tampered data only if tampering is detected;
a second processing circuit configured to perform a predetermined process on data output from the first processing circuit into the audio data and the video data, and to add tamper information indicating the data has been subjected to tampering to the processed data only if the data includes the tamper flag; and
a third processing circuit configured to receive data output from the second processing circuit and process the received data such that when the received data does not include tamper information, the received data is processed in a normal manner, but when the received data includes tamper information added thereto, the received data is processed differently from the normal manner such that data output by the third processing circuit when tamper information has been added is different than data output by the third processing circuit when tamper information has not been added.

2. The information processing apparatus according to claim 1, wherein the data processed by the second processing circuit includes at least video data, and in the case where the video data includes tamper information added thereto, the third processing circuit processes the video data such that the video data is not displayed in a normal manner.

3. The information processing apparatus according to claim 2, wherein when the second processing circuit receives the video data including the tamper flag added thereto, the second processing circuit adds scramble information as tamper information in a blanking area of the video data, and when the third processing circuit receives the video data including the scramble information added thereto, the third processing circuit scrambles the video data and displays the scrambled video data.

4. The information processing apparatus according to claim 2, wherein when the second processing circuit receives video data including the tamper flag added thereto, the second processing circuit outputs tamper information indicating that no video data should be displayed, and when the third processing circuit receives the tamper information indicating that no video data should be displayed, the third processing circuit stops displaying of the video data.

5. The information processing apparatus according to claim 1, wherein the data processed by the second processing circuit includes at least audio data, and in the case where the audio data includes tamper information added thereto, the third processing circuit stops outputting of the audio data.

6. The information processing apparatus according to one of claims 1 to 5, further comprising an external output controller configured to control outputting of data such that when the data processed by the first processing circuit is output to the outside, if the data includes the tamper flag added thereto, the data is output after the tamper flag is cleared.

7. An information processing apparatus comprising:

an encryption processing core, including a hardware circuit, configured to decode encoded stream data including audio data and video data input to the encryption processing core and to detect tampering on encryption information, the encryption processing core being configured to add a tamper flag to tampered data only if tampering is detected;

a demultiplexer configured to demultiplex stream data supplied from the encryption processing core into the video data and the audio data, and to output the demultiplexed data after adding information indicating the data has been subjected to tampering to the data only if the data includes the tamper flag added thereto; and a display processing core configured to receive the data output from the demultiplexer and display the data such that when the data does not include the tamper information added thereto, the data is displayed in a normal manner, but when the data includes the tamper information added thereto, the data is scrambled or displaying of the data is stopped such that data output by the display processing core when tamper information has been added is different than data output by the display processing core when tamper information has not been added.

* * * * *